June 29, 1965  A. G. LORBACHER  3,191,592
OUTDOOR COOKING GRILL
Filed Oct. 15, 1963
2 Sheets-Sheet 2
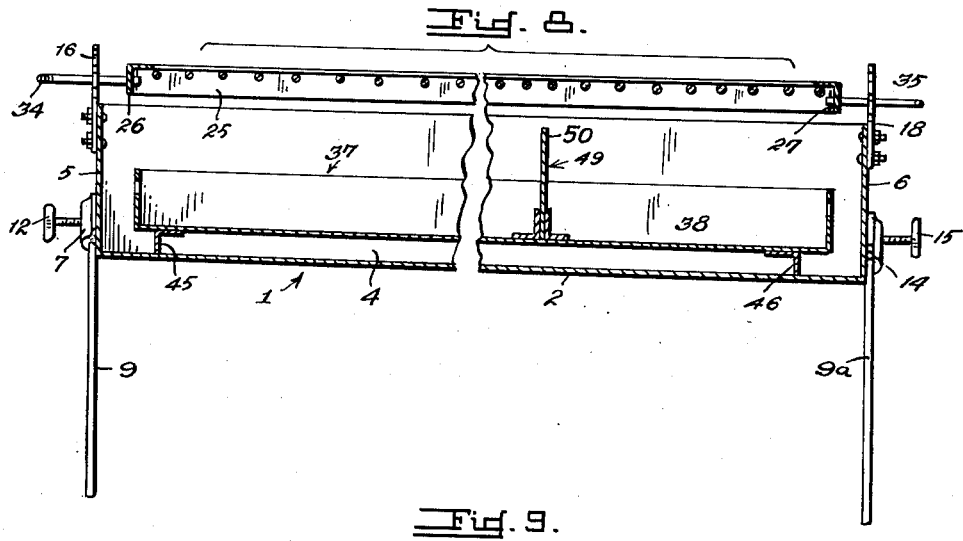
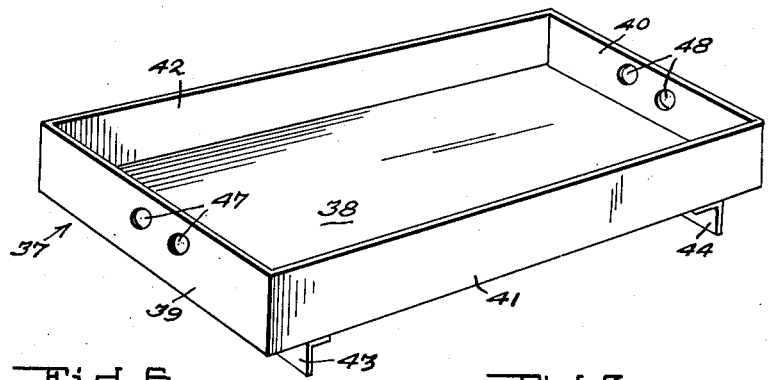
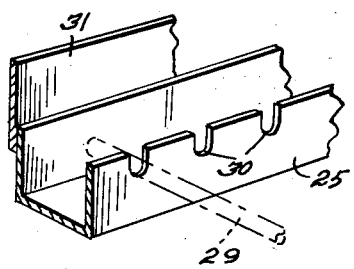
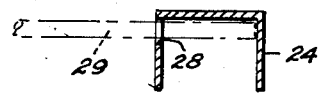
INVENTOR.
Alton G. Lorbacher
BY
Elizabeth Newton Dew
Attorney.

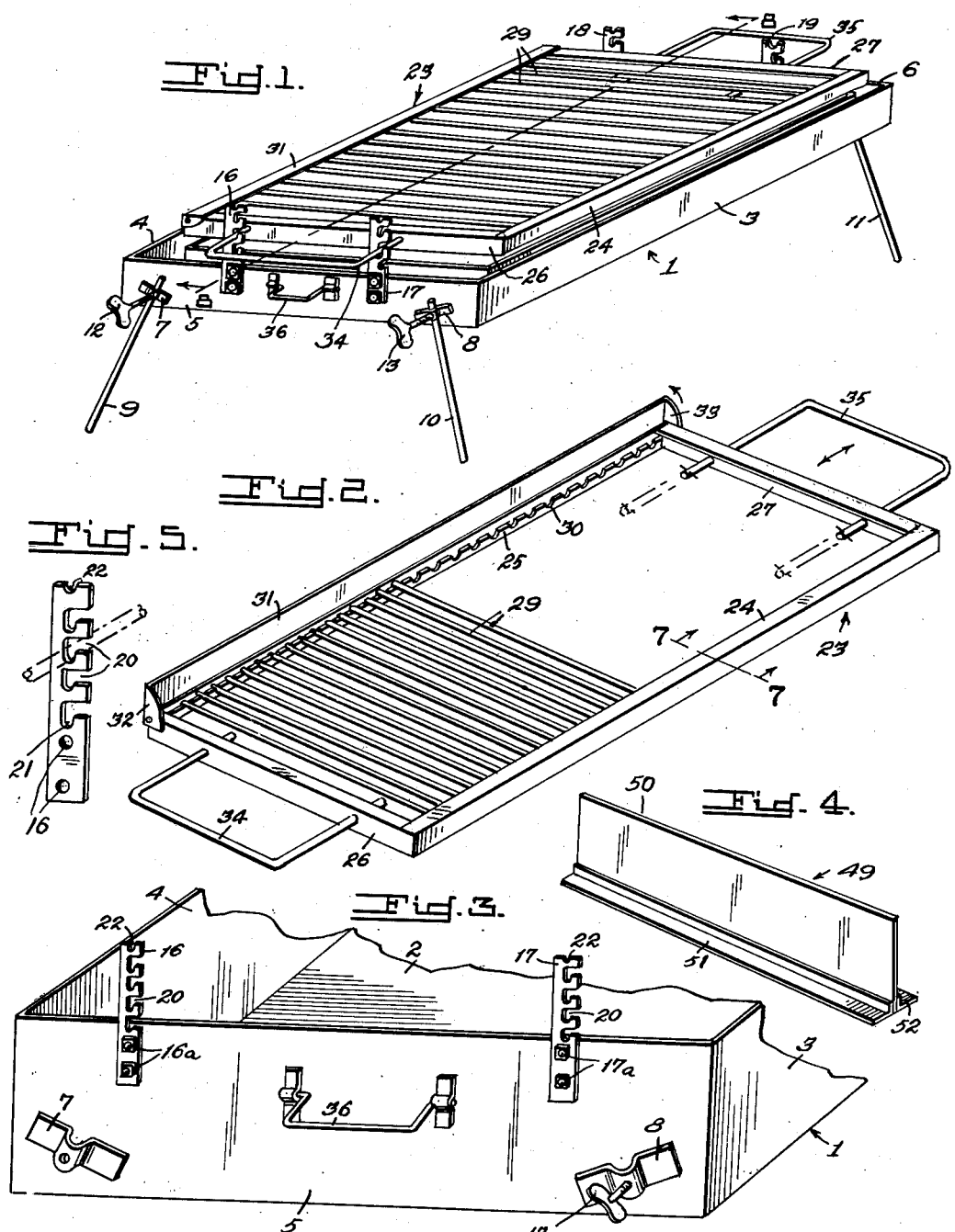

United States Patent Office 3,191,592
Patented June 29, 1965

3,191,592
OUTDOOR COOKING GRILL
Alton G. Lorbacher, 306 E. Peace St., Raleigh, N.C.
Filed Oct. 15, 1963, Ser. No. 316,330
2 Claims. (Cl. 126—25)

In my Patent Number 3,101,080, dated August 20, 1963, I have disclosed an outdoor cooking grill consisting essentially of an open-top, parallelepipedal firebox having a rectangular grill element fitting and vertically adjustable above and relatively to the bottom of the box. Mechanical means are shown for effecting such vertical adjustment by means of a crank positioned adjacent one exterior side wall of the box.

The present invention, while retaining all the features and advantages of my aforesaid patent, discloses an improved and simplified structure for supporting the grill in a selected position of vertical adjustment over and relatively to the firebox.

It is the chief object of the present invention to provide an outdoor cooking grill which is simple and inexpensive to construct and assemble, easy to clean and adjust in vertical height of the grill above the firebox, readily dismantled to occupy minimum shipping and storage space, easily set up for use and, in use, very satisfactory for its intended purpose of outdoor cooking of foods.

A further object is to provide a fire pan which may be set down inside the firebox and in which the fire is actually contained, so that the pan may be readily and inexpensively replaced or renewed as required while the firebox lasts indefinitely.

Other objects and advantages of the invention will be apparent to those skilled in the art, after a study of the following detailed description, in connection with the accompanying drawing.

In the drawing:

FIGURE 1 is a perspective view of the complete unit assembled ready for use;

FIGURE 2 is a perspective view to a somewhat enlarged scale, of the grill element per se, with supporting and manipulating handles extended;

FIGURE 3 is a broken detail view to a still further enlarged scale, of one end of the firebox, showing its two removable grill-supporting rods in place;

FIGURE 4 is a detail perspective view of the fire-wall for confining a fire in the box to one end thereof;

FIGURE 5 is a perspective view to a scale enlarged over FIGURE 3, of one of the grill-supporting bars or rods;

FIGURE 6 is a broken detail view to a greatly enlarged scale, of a portion of one of the side channels of the grill-rod frame, with cover strip open;

FIGURE 7 is a vertical section in a plane identified by line 7—7, FIGURE 2;

FIGURE 8 is a longitudinal vertical section of the fully-assembled grill, taken in a plane identified by line 8—8, FIGURE 1; and FIGURE 9 is a perspective view of the fire pan.

A sheet metal firebox generally identified at 1, consists of a flat bottom 2, side walls 3, 4, and end walls 5, 6, all united at their meeting edges into a unitary item. Both end walls are provided with brackets such as 7 and 8 for wall 5. Each bracket is welded or riveted to its end wall, and includes a semi-cylindrical central offset to receive with a smooth fit a respective one of four legs. Three of these, namely 9, 10 and 11, are shown upon FIGURE 1. The fourth appears at 9a, FIGURE 8. Each leg may consist simply of a length of metal rod or tubing. The central offset of each bracket is drilled and tapped for a winghead set screw such as 12 and 13, FIGURE 1, and 15, FIGURE 8. From FIGURE 1 as well as from FIGURE 3 it is noted that the brackets are attached to the respective end walls in position such that a leg, when inserted thereinto, will be inclined downwardly and outwardly at an acute angle, to thus give greater stability to the assembly.

Thus, each of the four legs is readily attachable to the firebox merely by inserting it into the bracket and tightening its set screw. Furthermore, the legs are individually vertically adjustable so that the elevation of the firebox above ground may be correspondingly adjusted and compensation made to support the box and grill element in level position in case the ground or other supporting surface is sloping or uneven. It will be understood that the leg brackets on end wall 6, such as 14, FIGURE 8, are similarly attached and disposed in the same positions as those shown on wall 5, FIGURE 1.

Each end wall 5 and 6 also has detachably affixed thereto, as by machine screws 16a, 17a, a pair of slotted grill frame supporting bars 16, 17, 18 and 19. All of these bars are duplicates so that, referring to FIGURE 5, it is sufficient to explain that bar 16 has a plurality, shown as four in number, of slots 20 extending horizontally inwardly from the upper portion of one side edge thereof. Each slot has its inner end downwardly notched as at 21, FIGURE 5. Another notch 22 may be provided in the top edge of the bars. All notches are vertically aligned and lie in a vertical plane normal to the plane of the bar and midway between its vertical side edges. Thus the position of the notches of each bar transversely of the firebox is the same no matter which side is contiguous to the box. For example, bar 17, FIGURE 3, may be reversed with its slots 20 opening to the left, without altering the distance between its notches 21 and those of bar 16.

The grill unit generally identified at 23, FIGURES 1 and 2, comprises a rectangular frame built up from metallic channels including sides 24, 25, and end strips 26, 27, and welded into a unitary part. Referring to FIGURES 6 and 7, it is noted that channel 24 is disposed facing downwardly while channel 25 faces upwardly.

Channel 24 has a series of uniformly-spaced holes in its inner vertical side wall. One of these is identified at 28, FIGURE 7. Each of these holes is preferably located adjacent the horizontal top wall of the channel and is sized to receive the end of a respective one of a number of grill rods 29 with a smooth fit. The side channel 25, as indicated at 30, FIGURE 6, has the top edge of its inner vertical wall notched at regularly-spaced intervals therealong, to receive with a smooth fit the other end of each respective rod. Each notch lies directly opposite a corresponding hole in strip 24 and the number thereof is equal to the number of holes so that, in a way obvious from inspection of FIGURES 2, 6 and 7, the ends of each rod are held in parallel uniformly-spaced relation. FIGURE 7 shows that each rod, when properly positioned in its hole in strip 24, has its end closely adjacent the outer vertical wall thereof. At the same time its other end is held within a notch 30 so that the rod is thereby held against any substantial translation in the direction of its length.

A cover strip 31 consisting of a flat length of metal, has the same length as side channel 25. The ends of this strip are turned at 90° to form flanges 32 and 33, FIGURE 2, by which the cover is pivoted to channel 25 for movement about a longitudinal axis closely adjacent the top plane of the channel, from the open position shown upon FIGURES 2 and 6, wherein the ends of all rods resting in notches 30 are exposed, to the closed position of FIGURE 1 wherein the strip overlies the contiguous ends of all grill rods, retains them in position and forms a protective cover for the channel. Thus when cover 31 is in the position of FIGURE 1 all rods are held against removal from the frame, while when in the position of FIGURE 2, all rods are individually removable by lifting each out of its notch 30 and sliding it axially out of its hole 28.

Each end 26 and 27 of the grill-rod frame is provided with a combined handle and support. Referring more particularly to FIGURE 2, handle 34 is a length of rod bent into the form of a rectangular U. The dimensions are such that the distance between the arms of the U is equal to the distance between notches 20 of bars 16 and 17 when these are fixed in the positions shown. These arms slidably fit respective holes in the end strip 26 so that the handle may be slid from an extended position substantially as shown upon FIGURE 2, to a collapsed position wherein the bight of the handle lies against channel 26 and the arms thereof a little below the plane of the grill rods, as indicated in dotted lines, FIGURE 2, for handle 35. Since this handle is a duplicate of handle 34 and is similarly mounted to end channel 27, it is not necessary to describe it in detail. Means not shown may be provided to limit outward movement of each handle. Such means, for example, may be simply a small metal pin having a press fit in a diametral hole in the distal end of each arm. Or such end may be threaded to receive a stop nut. Alternatively the handles may be simply pulled entirely free of the grill frame when the device is to be taken apart or stored. When handles 34 and 35 are collapsed against their respective strips 26 and 27, the entire grill-rod frame fits smoothly into the firebox. Two handles, one of which is shown at 36, FIGURE 3, are attached, one to each end wall 5 and 6 of firebox 1, to facilitate lifting and emplacement of the firebox and the assembled unit.

A sheet metal fire pan is indicated generally at 37, FIGURES 8 and 9, and includes a rectangular bottom 38, end walls 39, 40, and side walls 41, 42, all united as by welding along their meeting edges to form an open-top pan. Four feet such as 43 through 46, FIGURES 8 and 9, are secured as by welding, one to each corner of the bottom 38, to support the pan on and in vertically-spaced relation with respect to bottom 2 of firebox 1. Each end wall 39, 40, has a pair of finger holes 47, 48, centrally therein to facilitate placement in and lifting from the firebox. From FIGURE 8 it is seen that the pan fits loosely down and within the box and has walls which are less in vertical dimension than those of the box.

A fire wall such as 49, FIGURE 4, consists of a flat vertical rectangular plate 50 having a pair of 90° angles 51 and 52 welded thereto along its lower edge to form a supporting base. The length of the wall is a little less than the transverse inside dimension of the fire pan and its vertical dimension is such that when the grill rod frame is supported in the lowermost notches of bars 16, 17, 18 and 19, its top edge will be flush with the bottom of the grill rod frame. The pan forms a convenient partition when a fire covering less than the entire area of the pan is sufficient. In such cases the wall confines the fire to the desired area and at the same time conserves heat and directs it upwardly to the food being cooked. Another advantage of the fire wall is that the manufacturer can make only one size of grill and the operator or owner can cut it down to any desired size of firebed, and use only enough grill rods to cover that area.

The grill rod frame will not be lifted at both ends at the same time, when adjustment is needed, the operator will raise or lower one end while the other stays stationary, so that there will be no danger of spilling food thereon. It is for this reason that a clearance is provided between the ends of the frame and its support bars, as shown upon FIGURE 8.

In collapsed or dismantled position the grill rod frame with handles 34 and 35 in collapsed positions, fits down within box 1 and rests upon the top edges of fire pan 37. Alternatively the grill rod frame may be placed in box 1 first, followed by pan 37 whose feet 43, etc., will then project downwardly between adjacent pairs of grill rods. Where the grill rod frame is on top, fire wall 49 will rest in a half-turned-over position so that it does not project above the plane of the top edges of the box. Legs 9, 10, etc. are removed, each from its socket and deposited in the box. Grill-rod frame support bars are similarly removed and positioned within the pan or box. The entire device is then in one compact package with all parts within the confines of the firebox.

In setting up the invention for use, each leg is inserted into its bracket 7, 8, etc., and the set screws are tightened to support the box at convenient elevation above ground. Since each leg is individually adjustable, compensation is readily effected where the supporting surface is uneven or out of level. Bars 16, 17, 18 and 19 are then secured in place by screws 16a, 17a, etc. Grill unit 23 is then lifted from the firebox or pan and handles 34 and 35 are either inserted or pulled out to the extended positions shown upon FIGURE 2. Then the grill unit is lowered to the desired height above the firebox and moved horizontally until each arm of each handle enters a corresponding slot 20 in bars 16, 17, etc., and finally dropped into respective notches 21 to be thereby accurately and reliably held in place over and transversely of the box. Handles 34 and 35 may then be again slid inwardly toward collapsed position until their bights contact the support bars, to thus adjustably maintain the grill unit in position longitudinally of the box. If desired, while the grill unit is in the position shown upon FIGURE 1, for example, it may be manually held while one pair of bars such as 17 and 19 may be removed and reversed, so that the same slot engages the arm of the handle but is in reverse position with respect to the other slot in the bar at that end. In such position the grill is positively held against lateral or horizontal translation out of the slots. In the position of the parts shown at FIGURE 1 the grill unit can be lifted free from the support bars, for serving cooked food at a table or other location.

Cleaning of the entire device is easy since the grill unit, when removed, leaves the fire pan free and open so that it may be readily removed and cleaned. The bars, legs, and grill rods are all individually detachable and easily cleaned, repaired when necessary, and replaced. The grill-rod frame, without rods therein, is likewise easily cleaned. Cover strip 31 in addition to maintaining all grill rods in position, acts when closed to protect channel 25 against the entrance of food and fuel particles. Thus the entire device may be kept neat, clean and sanitary at all times. The fire pan, being a simple sheet metal item is easily and inexpensively replaced as required.

While I have disclosed the form of my invention presently preferred, numerous changes of shape, form, and substitutions of equivalents will readily occur to those skilled in the art, after a study of the foregoing disclosure. Hence the disclosure should be taken in an illustrative sense only; and it is my desire and intention to reserve all changes within the scope of the subjoined claims. In these claims the terms "vertical," "horizontal" etc., are for convenience in defining the positions and relations of the parts as viewed upon FIGURE 1, and are not to be interpreted as limiting the invention to any particular position in actual use.

What I claim and desire to secure by Letters Patent is:
1. In a device for outdoor cooking, a one-piece firebox including spaced vertical first and second end walls, a first pair of vertical laterally-spaced, parallel support bars detachably fixed to said first end wall, a second pair of vertical laterally-spaced parallel support bars detachably fixed to said second end wall, each said support bar having a vertical side edge and a plurality of vertically-spaced notches extending inwardly from said edge, the ends of all notches of each said bar lying in a respective one of four vertical lines, the two lines thus determined by each said pair of bars being spaced a predetermined distance, a grill unit including a rigid frame including first and second horizontally-spaced parallel end strips, there being a pair of holes in each said end strip and horizontally spaced by said predetermined distance, first and second U-shaped handles each having its parallel arms speced by said predetermined distance, each arm of each handle slidably fitting a respective hole of a corresponding end strip, all said arms being adapted for simultaneous insertion each into a selected notch of a corresponding one of said support bars, to thereby support said grill at a selected height over and above said firebox, each said handle being slidable to position its bight portion into contact with a corresponding pair of said support bars.

2. The device of claim 1, each said support bar of each said par being reversible, edge for edge, with respect to the other bar of its pair, without change in said predetermined distance of the two lines determined thereby, to thus enable said handles to be releasably locked in a selected set of said notches, and said grill to be releasably locked a selected distance above and to said firebox.

References Cited by the Examiner
UNITED STATES PATENTS

| | | | |
|---|---|---|---|
| 2,048,769 | 7/36 | Anderson | 99—393 |
| 2,058,172 | 10/36 | Myers | 126—25 |
| 2,477,529 | 7/49 | Sprinkle et al. | 126—9 |
| 2,511,594 | 6/50 | Loffredo | 126—9 |
| 2,608,190 | 8/52 | Winning et al. | 126—9 X |
| 2,740,395 | 4/56 | Goodwin. | |
| 3,053,245 | 9/62 | Beller | 126—25 |
| 3,101,080 | 8/63 | Lorbacher | 126—25 |

JAMES W. WESTHAVER, *Primary Examiner.*